(12) United States Patent
Moussa

(10) Patent No.: US 10,944,676 B2
(45) Date of Patent: Mar. 9, 2021

(54) DYNAMIC CONGESTION MANAGEMENT

(71) Applicant: Tata Communications (UK) Limited, London (GB)

(72) Inventor: Hesham Moussa, London (GB)

(73) Assignee: Tata Communications (UK) Limited, London (GB)

( * ) Notice: Subject to any disclaimer, the term of this patent is extended or adjusted under 35 U.S.C. 154(b) by 48 days.

(21) Appl. No.: 16/325,290

(22) PCT Filed: Aug. 15, 2017

(86) PCT No.: PCT/IB2017/054968
§ 371 (c)(1),
(2) Date: Feb. 13, 2019

(87) PCT Pub. No.: WO2018/033858
PCT Pub. Date: Feb. 22, 2018

(65) Prior Publication Data
US 2019/0173792 A1    Jun. 6, 2019

Related U.S. Application Data

(60) Provisional application No. 62/375,184, filed on Aug. 15, 2016.

(51) Int. Cl.
*H04L 12/801* (2013.01)
*H04L 12/815* (2013.01)
(Continued)

(52) U.S. Cl.
CPC .............. *H04L 47/11* (2013.01); *H04L 47/21* (2013.01); *H04L 47/22* (2013.01); *H04L 47/225* (2013.01); *H04L 47/24* (2013.01)

(58) Field of Classification Search
CPC ....... H04L 47/24; H04L 47/21; H04L 47/225; H04L 47/11; H04L 47/22–225;
(Continued)

(56) References Cited

U.S. PATENT DOCUMENTS 5,905,870 A  *  5/1999  Mangin .................. H04L 47/10
                                                    709/213
6,167,029 A  *  12/2000  Ramakrishnan ...... G06F 13/385
                                                    370/235

(Continued)

OTHER PUBLICATIONS

Blake et. al. "Request for Comments 2475" Dec. 1998, p. 17 (Year: 1998).*

(Continued)

*Primary Examiner* — Maharishi V Khirodhar
*Assistant Examiner* — Kenneth P Hunt
(74) *Attorney, Agent, or Firm* — Kaplan Breyer Schwarz, LLP

(57) ABSTRACT

Methods and systems for dynamic congestion management in communications networks that advantageously provides a satisfactory Quality of Experience (QoE) of real time communication for network users. Congestion management is achieved wherein an ingress interface is monitored by a data processing system and when utilization of that interface exceeds a first activation level a message is sent to a second data processing system wherein that second data processing system is a source for at least some of data packets traversing the ingress interface, wherein the first message indicates that traffic shaping is to occur in accordance with the first activation level and only if the utilization falls below a deactivation level, transmitting a second message to the second data processing system wherein the second message indicates that traffic shaping is to stop.

18 Claims, 10 Drawing Sheets

(51) Int. Cl.
*H04L 12/819* (2013.01)
*H04L 12/851* (2013.01)

(58) Field of Classification Search
CPC ............ H04L 47/26–263; H04L 47/29; H04L 47/10–41; H04L 47/18; H04L 47/263; H04L 47/32
See application file for complete search history.

(56) References Cited

U.S. PATENT DOCUMENTS

| | | | | |
|---|---|---|---|---|
| 6,882,622 | B1* | 4/2005 | Donoghue | H04L 47/10 370/229 |
| 8,593,969 | B1 | 11/2013 | Kondapalli et al. | |
| 2003/0172220 | A1* | 9/2003 | Hao | H04L 47/266 710/305 |
| 2006/0120289 | A1* | 6/2006 | Cunningham | H04L 47/266 370/235 |
| 2007/0076613 | A1* | 4/2007 | Malhotra | H04L 43/00 370/235.1 |
| 2012/0243589 | A1* | 9/2012 | Desjardins | H04L 7/10 375/222 |
| 2013/0089101 | A1 | 4/2013 | Kamath et al. | |

OTHER PUBLICATIONS

International Telecommunications Union, "ITU-T I.371" Mar. 2004, p. 82-83 (Year: 2004).*
Authorized Officer: Cranley, Nikki, International Search Report and Written Opinion issued in PCT application No. PCT/IB2017/054968, dated Nov. 9, 2017, 17 pp.
Authorized Officer: Cai Chengjie (Dr), Written Opinion issued in counterpart Singapore patent application No. 11201901321P, dated Mar. 26, 2020, 6 pp.
Communication issued in counterpart European patent application No. 17768516.1, dated Feb. 5, 2020, 13 pp.
Controller of Patents: Livjot Sarangal, Examination Report issued in counterpart Indian patent application No. 201927007325, dated Jan. 4, 2021, 6 pages.

* cited by examiner

DYNAMIC CONGESTION MANAGEMENT

CROSS REFERENCE TO RELATED APPLICATIONS

This application claims the benefit of U.S. Provisional Patent Application Ser. No. 62/375,184 filed 15 Aug. 2016 the entire contents of which are incorporated herein as if set forth at length herein.

TECHNICAL FIELD

This disclosure relates generally to telecommunications networks and services employing same. More particularly, it pertains to systems, methods, and structures providing dynamic congestion management of these telecommunications networks.

BACKGROUND

The networked and mobile computing environment that defines much of contemporary society has provided innumerable convenience and productivity benefits. Particularly noteworthy, networks interconnected via routable protocols—i.e., the Internet—have provided global platforms upon which profoundly useful data/information spaces such as the World-Wide-Web (WWW) are constructed.

As will be readily understood, the networks comprising the Internet are required to carry an ever-increasing amount traffic as services provided thereon (i.e., Office 365, Skype for Business, Jamvee, Sales Force.com—among others) are being increasingly employed. Due to this increased traffic, congestion of this traffic is an ever-increasing problem. These congestion problems are made further acute as networks such as the Internet are best-effort networks that do not provide any special features that guarantee delivery.

Accordingly, systems, methods, and structures that effectively manage this congestion—while maintaining a satisfactory Quality of Experience (QoE) of real time communications for users would represent a welcome addition to the art.

SUMMARY

An advance is made in the art according to aspects of the present disclosure directed to systems, methods, and structures for dynamic congestion management in communications networks. In sharp contrast to the prior art, systems, methods, and structures according to the present disclosure provide dynamic congestion management in best effort networks while maintaining a satisfactory Quality of Experience (QoE) of real time communication for users of the network.

Viewed from a first aspect, the present disclosure is directed to a method for congestion management in a network comprising: provisioning a deactivation level and a first activation level, wherein the deactivation level is less than the first activation level; monitoring, by a first data-processing system, an ingress interface for utilization by incoming packets. Only if the utilization rises above the first activation level, transmitting a first message to a second data-processing system, wherein the second data-processing system is a source of at least some of the incoming packets, and wherein the first message indicates that traffic shaping is to occur in accordance with the first activation level; and only if the utilization falls below the deactivation level, transmitting a second message to the second data-processing system, wherein the second message indicates that traffic shaping is to cease.

Viewed from another aspect, the present disclosure is directed to a system and/or apparatus for congestion management in a network comprising: i) a processor configured to: provision a deactivation level and a first activation level, wherein the deactivation level is less than the first activation level, and monitor an ingress interface for utilization by incoming packets; ii) a transmitter configured to: only if utilization rises above the first activation level, transmit a first message to a second data-processing system, wherein the second data-processing system is a source of at least some of the incoming packets, and wherein the first message indicates that traffic shaping is to occur in accordance with the first activation level, and only if the utilization falls below the deactivation level, transmit a second message to the second data-processing system, wherein the second message indicates that traffic shaping is to cease.

Advantageously, and as will become apparent to those skilled in the art, systems, methods and structures according to the present disclosure perform dynamically, support asymmetric bandwidths (i.e., ADSL), are network agnostic so they advantageously operate over Internet, integrate with private virtual networks (VPNs), and Multi-Protocol Label Switching networks (MPLS); will control all traffic types including Level 3 (DSCP, IPv4, IPv6, etc.) Level 4 (TCP, UDP, etc), Level 5-Level 7 (HTTP, Telnet, FTP, DNS, etc); Support many-to-any topologies; and limits rates at source(s) thereby conserving bandwidth on backbone (core) network(s).

Additional advantages that will become apparent to those skilled in the art is that systems, methods, and structures according to the present disclosure enable non-deterministic networks (Internet) to transport business-grade applications exhibiting a satisfactory Quality of Experience of real time communications for users.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

The phrase "based on" is defined as "being dependent on" in contrast to "being independent of". The value of Y is dependent on the value of X when the value of Y is different for two or more values of X. The value of Y is independent of the value of X when the value of Y is tis the same for all values of X. Being "based on" or includes both functions and relations.

BRIEF DESCRIPTION OF THE DRAWING

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Figure 1:
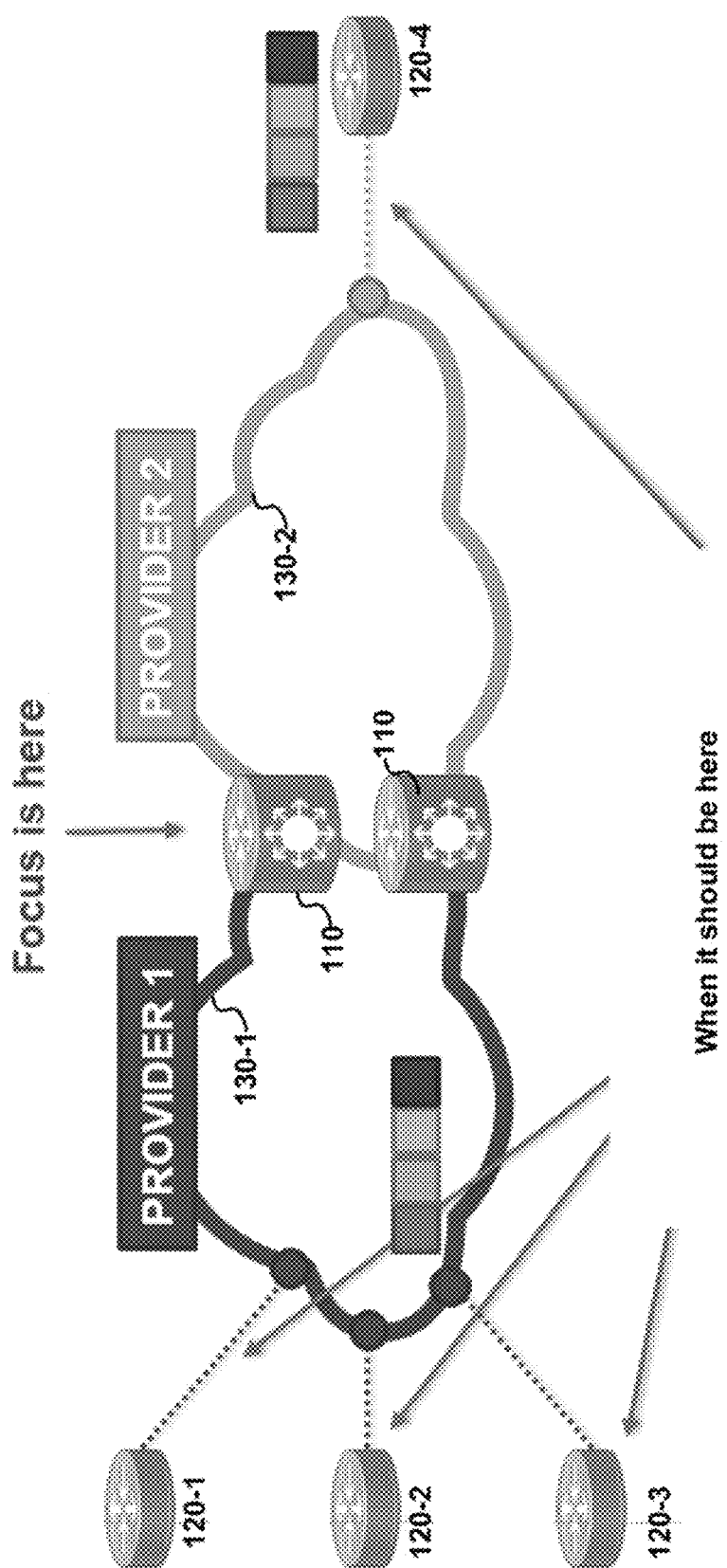
FIG. 1 shows a schematic diagram depicting an illustrative network architecture highlighting congestion problems and locations of same as experienced in the Prior Art.

By way of some additional background, we begin by noting with reference to FIG. 1 that there is essentially little—to no—support for queueing mechanisms or per-hop-behavior (PHB) on best-effort transport networks such as the Internet. As shown in FIG. 1, such networks may include a backbone—or core 110—and a number of edge networks 120-1, 120-2, 120-3, 1204. As will be known and understood by those skilled in the art, a core network (or network core) is a central part of a telecommunications network that may provide various services to subscribers while providing interconnection to the multiple access (edge) networks.

As further illustrated in FIG. 1, core networks may interconnect provider core networks 130-1, 130-2 which in turn interconnect edge networks. To date, congestion problems arising in such networks have resulted in solution efforts that are focused on the core network(s), rather than edge networks. Unfortunately, congestion is known to occur more frequently in edge networks ("last mile" networks) where best effort queuing is oftentimes employed in edge devices. As will be recognized by those skilled in the art, best effort queuing and best-effort delivery describes network operation wherein a network does not provide guarantees that data is delivered or that a user is given a guaranteed quality of service (QoS) level or a certain priority. Generally, in best-effort networks, all users obtain best-effort service meaning that they obtain an unspecified variable bit rate and delivery time(s)—depending on a current traffic load. Operationally, such best-effort queuing in an edge network during periods of congestion lead to jitter, delay, and packet loss. Accordingly, eliminating or otherwise minimizing queuing delay and resulting queue drops is of considerable technological interest to those skilled in the art and one aspect of the present disclosure.

Figure 2:
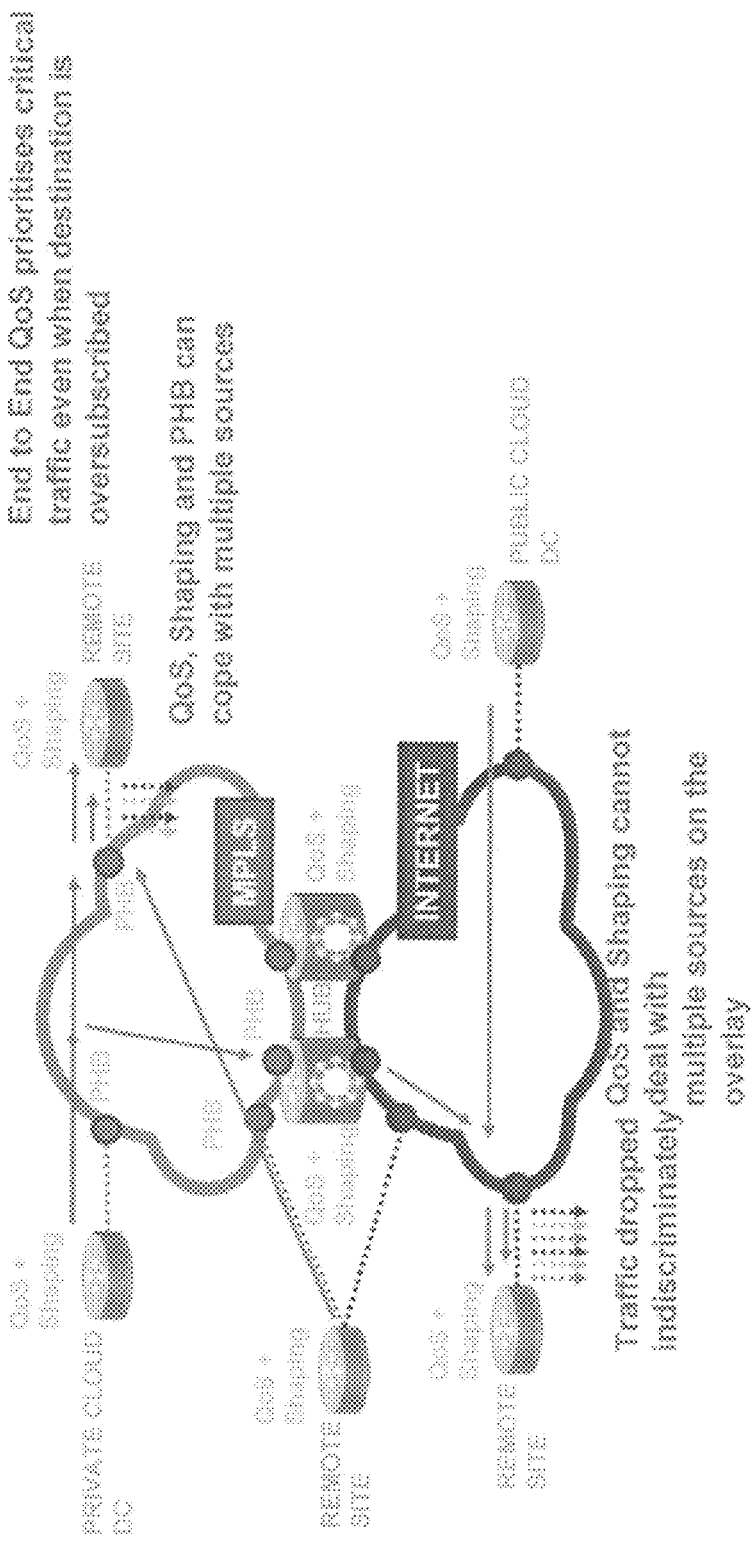
FIG. 2 shows a schematic diagram depicting an illustrative network architecture depicting flows in a mesh hybrid network with no congestion management.

To further appreciate aspects of the present disclosure, attention is now drawn to FIG. 2, which shows a schematic diagram of an illustrative network architecture depicting flows in a mesh hybrid network having no congestion management such as would be found in the prior art. As illustrated in that figure, a private cloud, overlay Multi-Protocol Label Switching (MPLS) network is shown internetworked with an Internet. Shown further in that FIG. 2 are several remote site(s) that access the MPLS network or Internet, or both, thereby resulting in the interconnected mesh topology.

At this point we note that MPLS is a packet labeling technique that may advantageously be employed to provide services such as virtual private networks (VPNs) or metro Ethernet services—among others. Operationally, with MPLS, when a packet is introduced into a network, it is generally assigned a specifically assigned a forwarding equivalence class (FEC), indicated by appending a short bit sequence (the label) to the packet. Each router in the network has a table indicating how to handle packets of a specific FEC, so once the packet enters the network routers don't need to perform a header analysis. Instead, subsequent routers use the label as an index into a table that provides them with a new FEC for that packet. Advantageously, this gives MPLS networks the ability to handle packets with particular characteristics (such as coming from particular ports or carrying traffic of particular application type) in a consistent manner. Packets carrying real time traffic, such as voice or video, can be mapped to low latency routes across the network—something that is challenging with conventional routing.

With continued reference to FIG. 2, we note further that per-hop behavior may provide traffic guarantees even from multiple sources, as illustrated in the figure with respect to the remote site depicted in the upper right. In contrast, an overlay network built upon a disordered network such as the Internet, for example, multiple sources of traffic pose problems as depicted by the remote site depicted in the lower left. Of particular concern, traffic ingress to a site is difficult to control.

Generally, prior-art approaches to congestion management has taken one of several paths. First, one approach involves providing any congestion management or avoidance, thereby allowing user application to contend for any available bandwidth. As may be appreciated, such an approach will likely leave a number of users without sufficient bandwidth availability during periods of heavy use thereby leading to a particularly low Quality of Experience (QoE) for those users so affected.

We note that as the term is used herein, QoE includes network, application, and device performance as well as content characteristic(s) and user past experiences—to name a few. Generally—as that term is used in the art and defined by Qualinet (European Network on Quality of Experience in Multimedia Systems and Services)—it is the degree of delight or annoyance of the user of an application or service. It results from the fulfillment of his or her expectations with respect to the utility and/or enjoyment of the application or service in light of the user's personality and current state. The ITU-T P.10/G.100 defines QoE as the overall acceptability of an application or service, as perceived subjectively by an end-user.

Second—at a hub directing traffic to a particular site—shaping the traffic so directed by manipulating or otherwise prioritizing the traffic in an attempt to reduce any impact of heavy users from affecting other users. Operationally, such traffic shaping retains packets in a queue and then schedules their transmission over time resulting in a smoothed traffic packet output rate. While such shaping may alleviate overrun by a single hub, it does not cure the problem of having a site overrun by multiple hubs.

Finally, it is noted that judicious choice/design of topology may alleviate some congestion management issues. In particularly, when a network exhibits a "hub and spoke" topology and a remote site is only accessible from a single hub, that remote site will not be overrun by multiple paths into it. In a hub and spoke (star) topology, a particular node acts as a hub (i.e., main office), while other nodes act as spokes. Spoke nodes are connected to each other via the hub. Accordingly, in a hub and spoke topology, network communication between two spokes always traverses the hub.

Figure 3A:
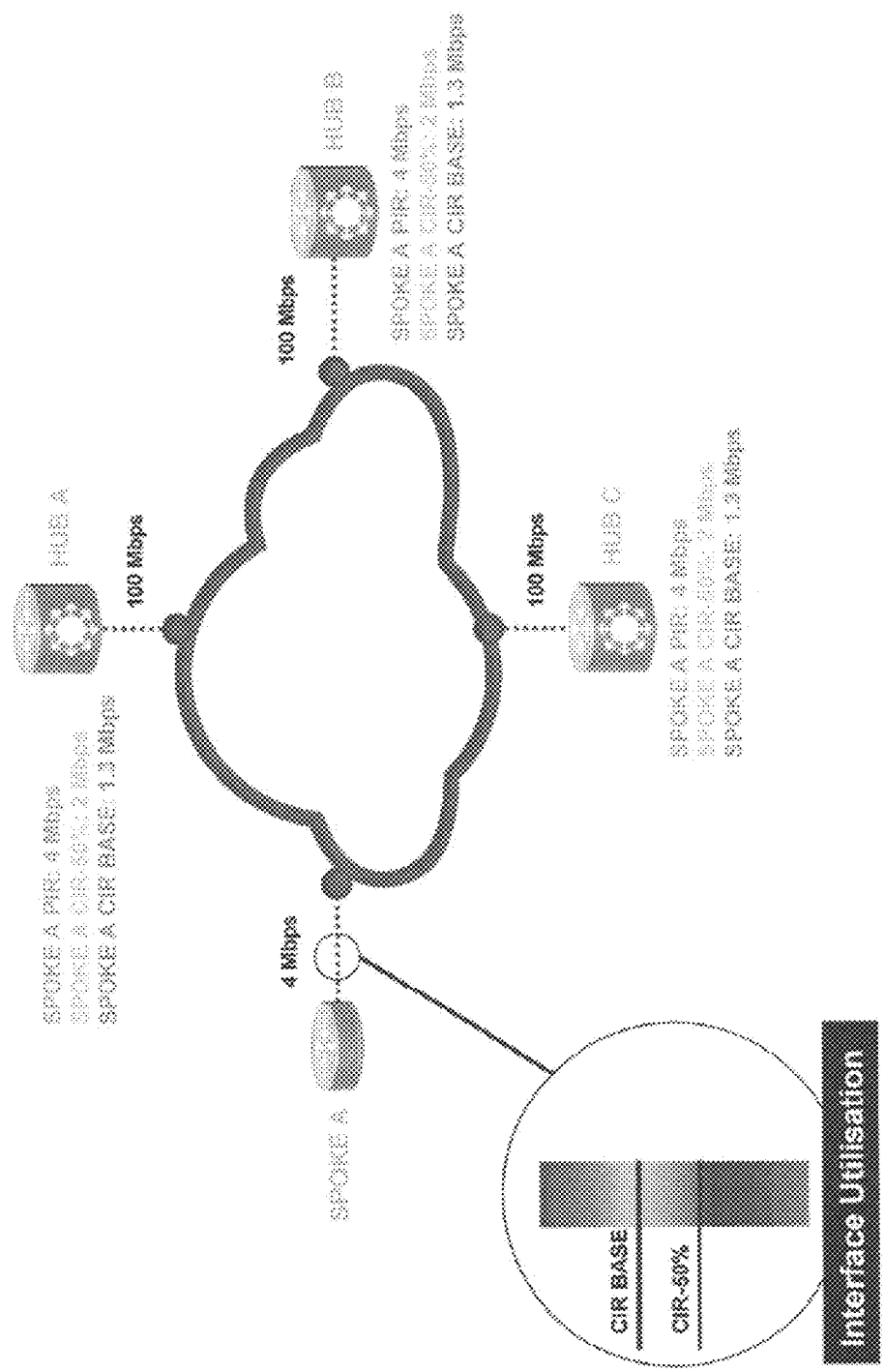
FIGS. 3(A)-3(G) show schematic diagram(s) of a telecommunications network and illustrative congestion management operation(s) according to aspects of the present disclosure.
Figure 3B:
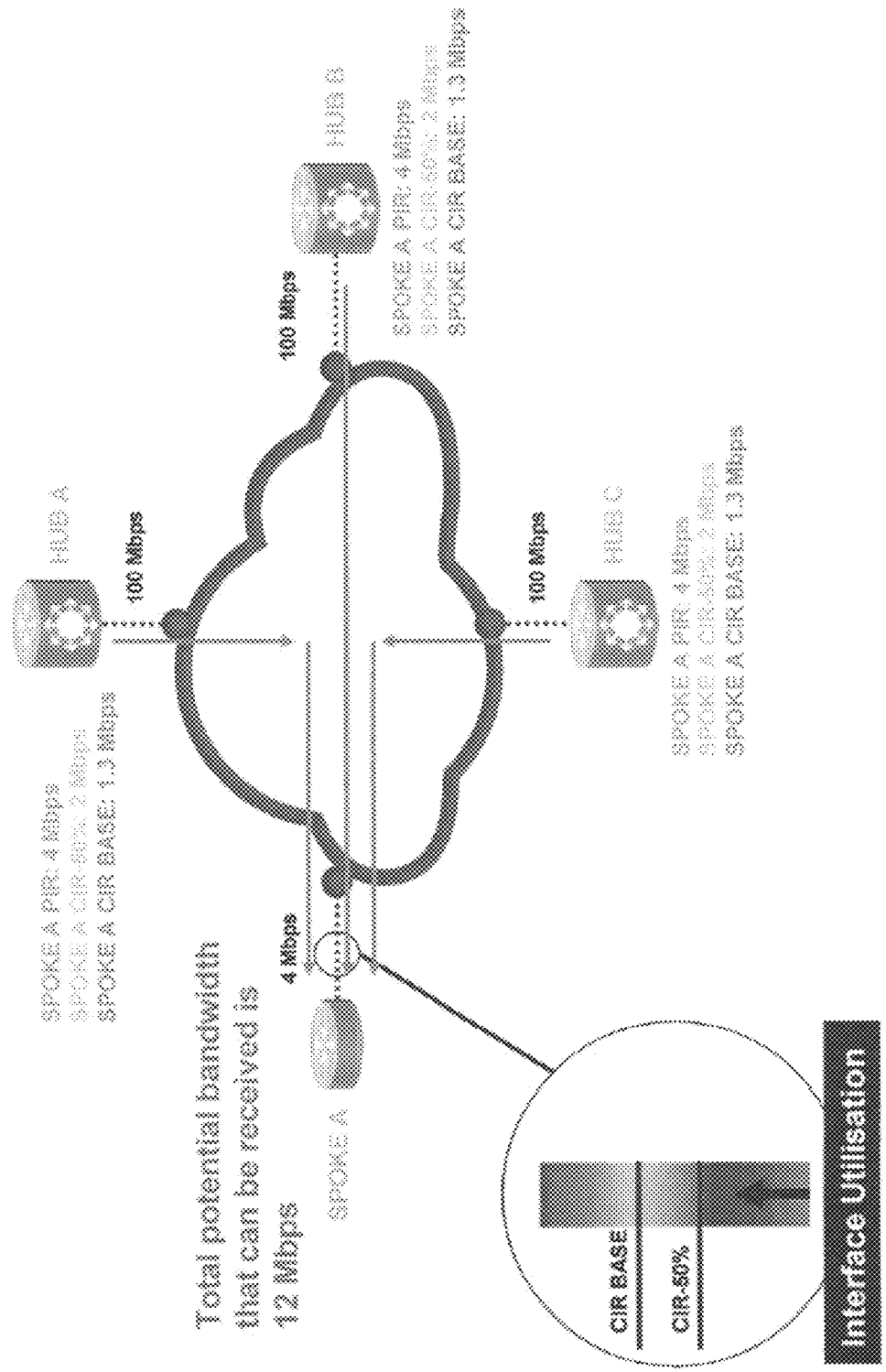
Figure 3C:
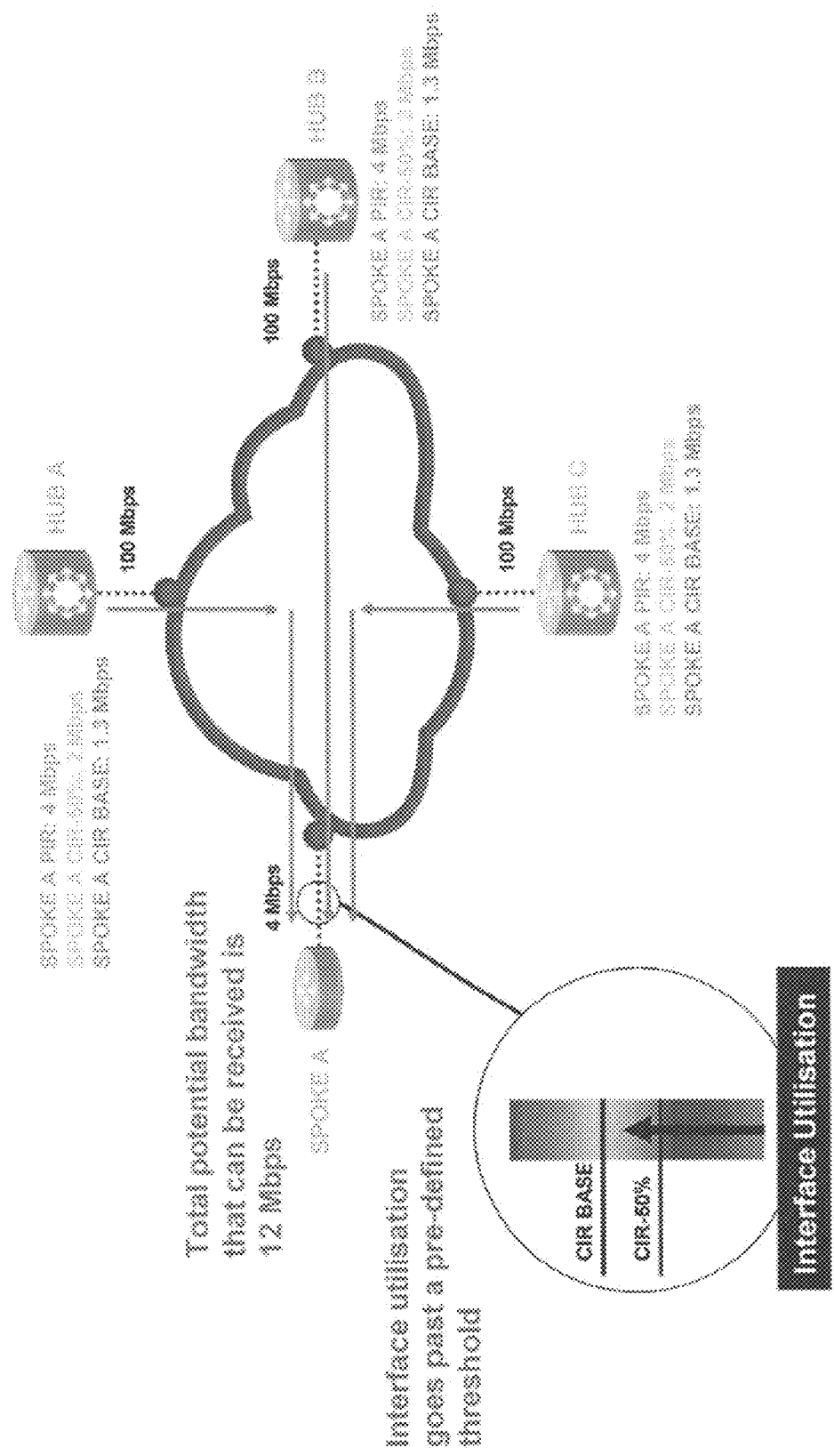
Figure 3D:
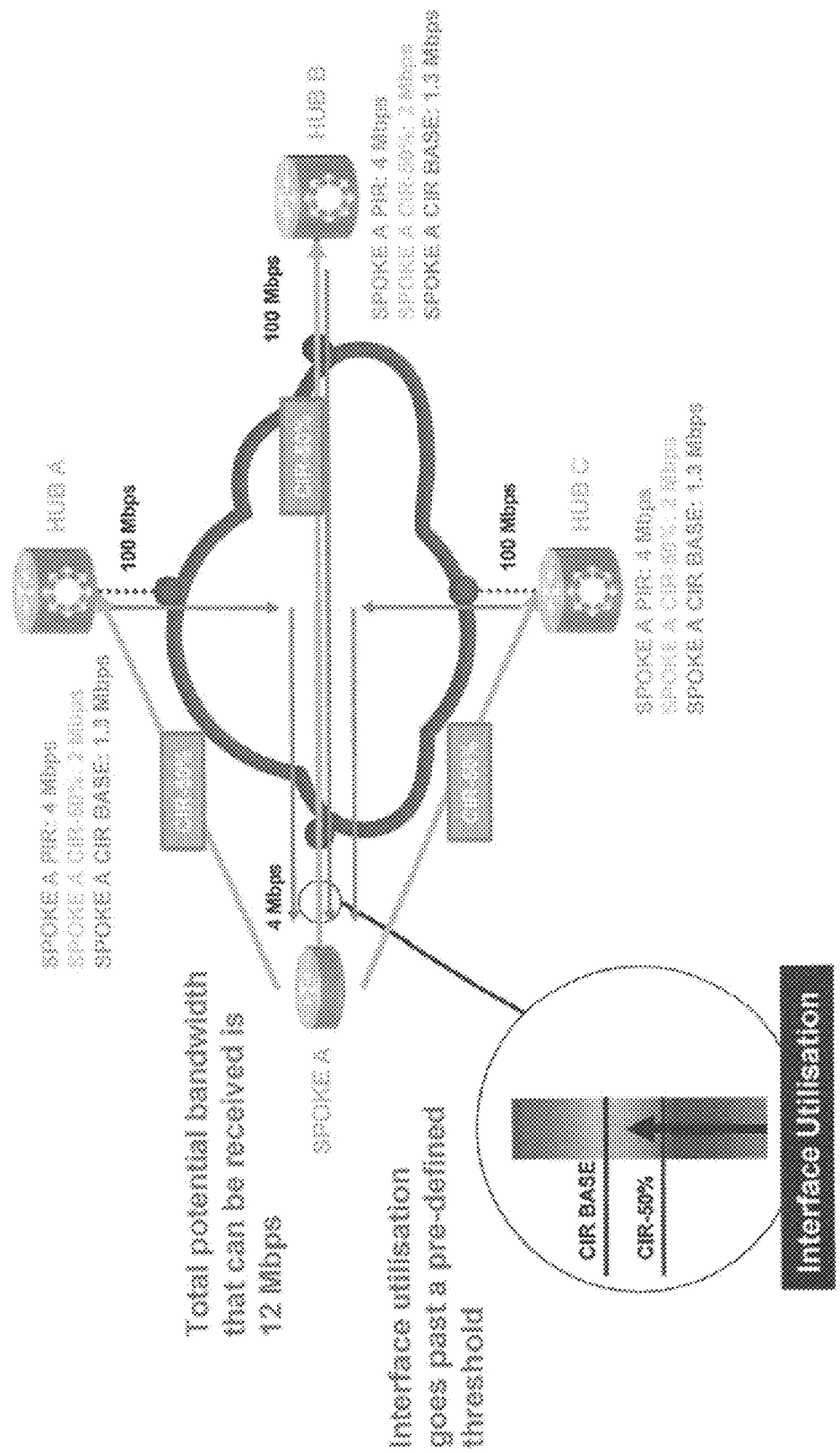
Figure 3E:
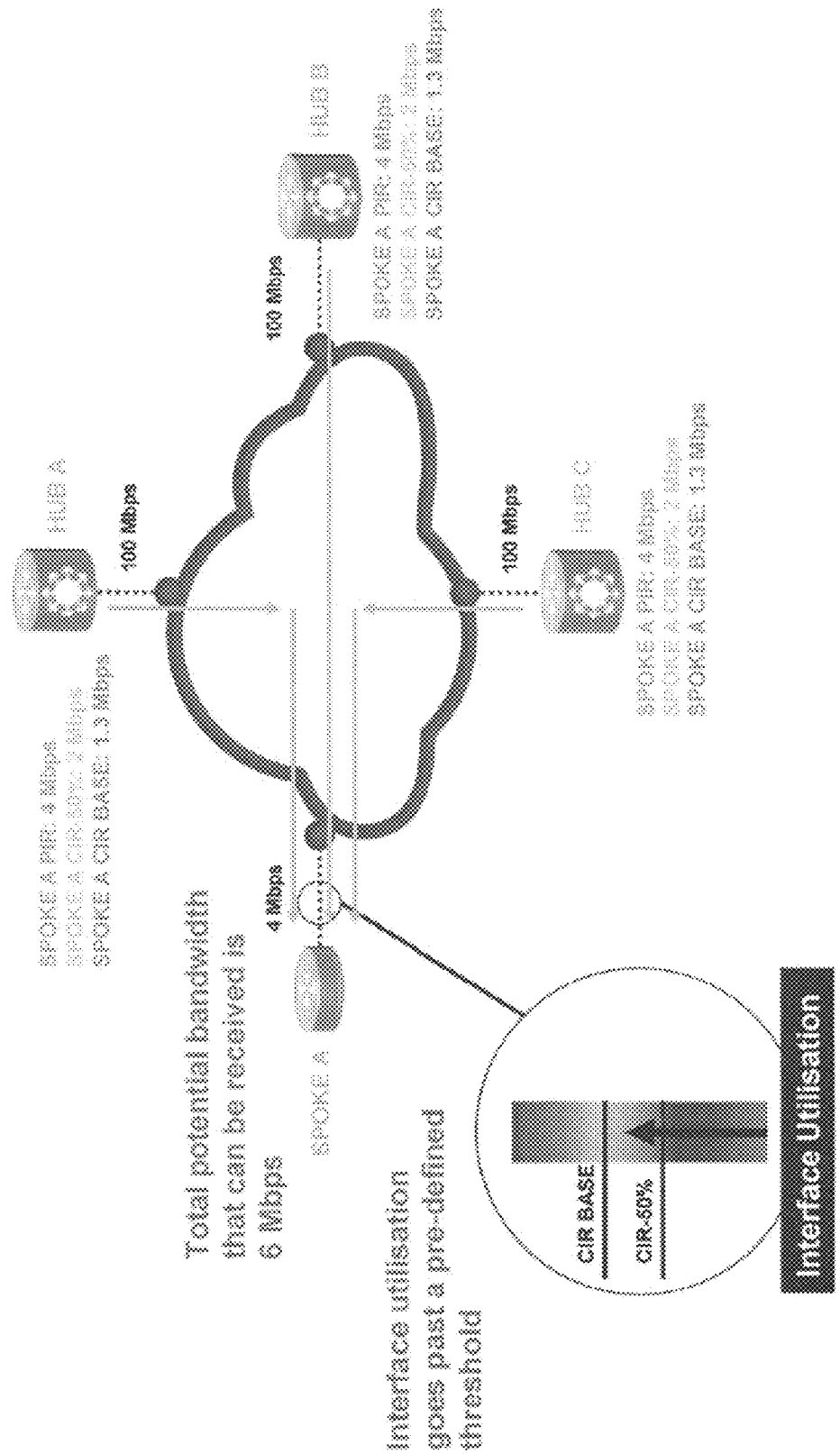
Figure 3F:
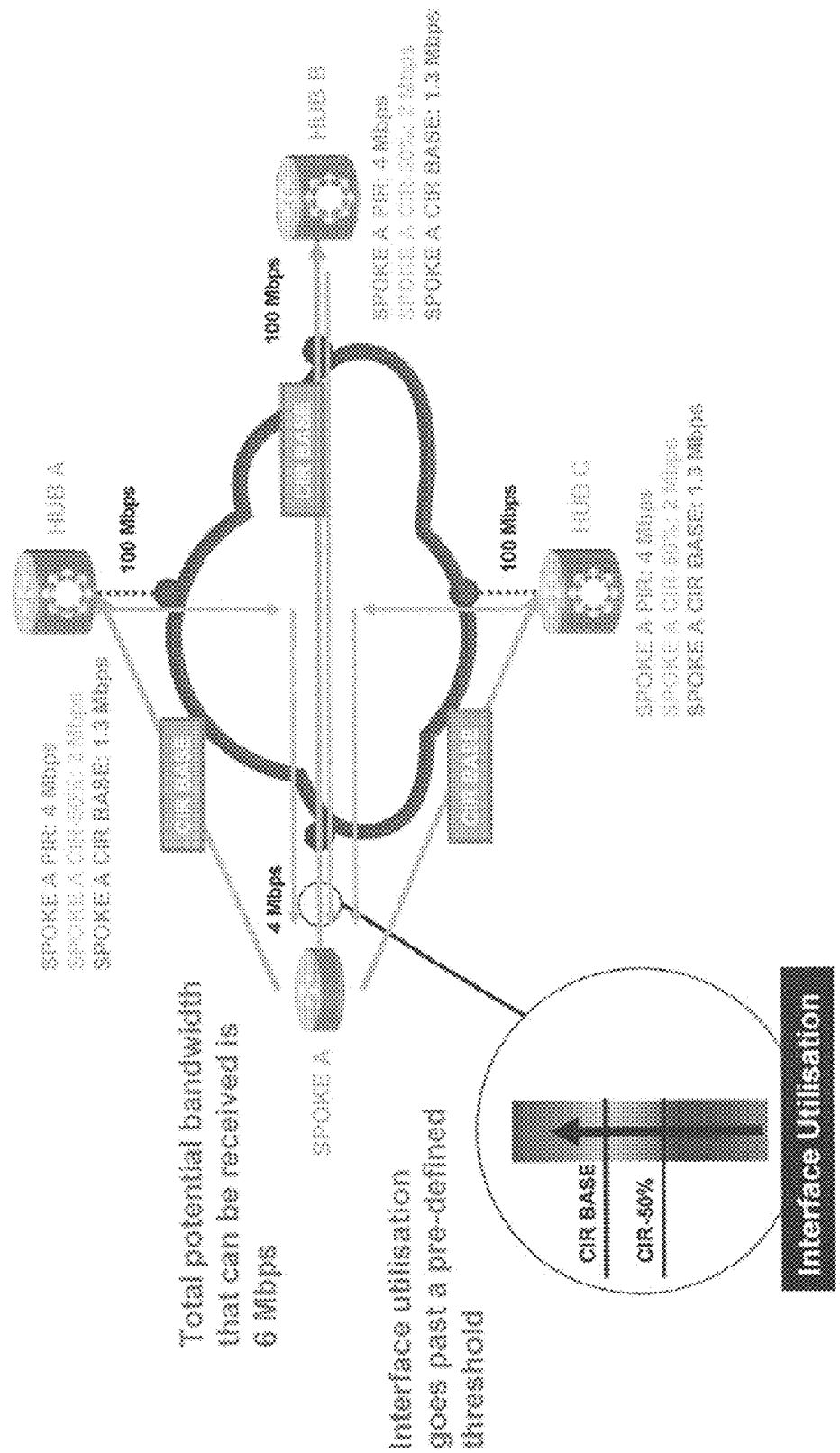
Figure 3G:
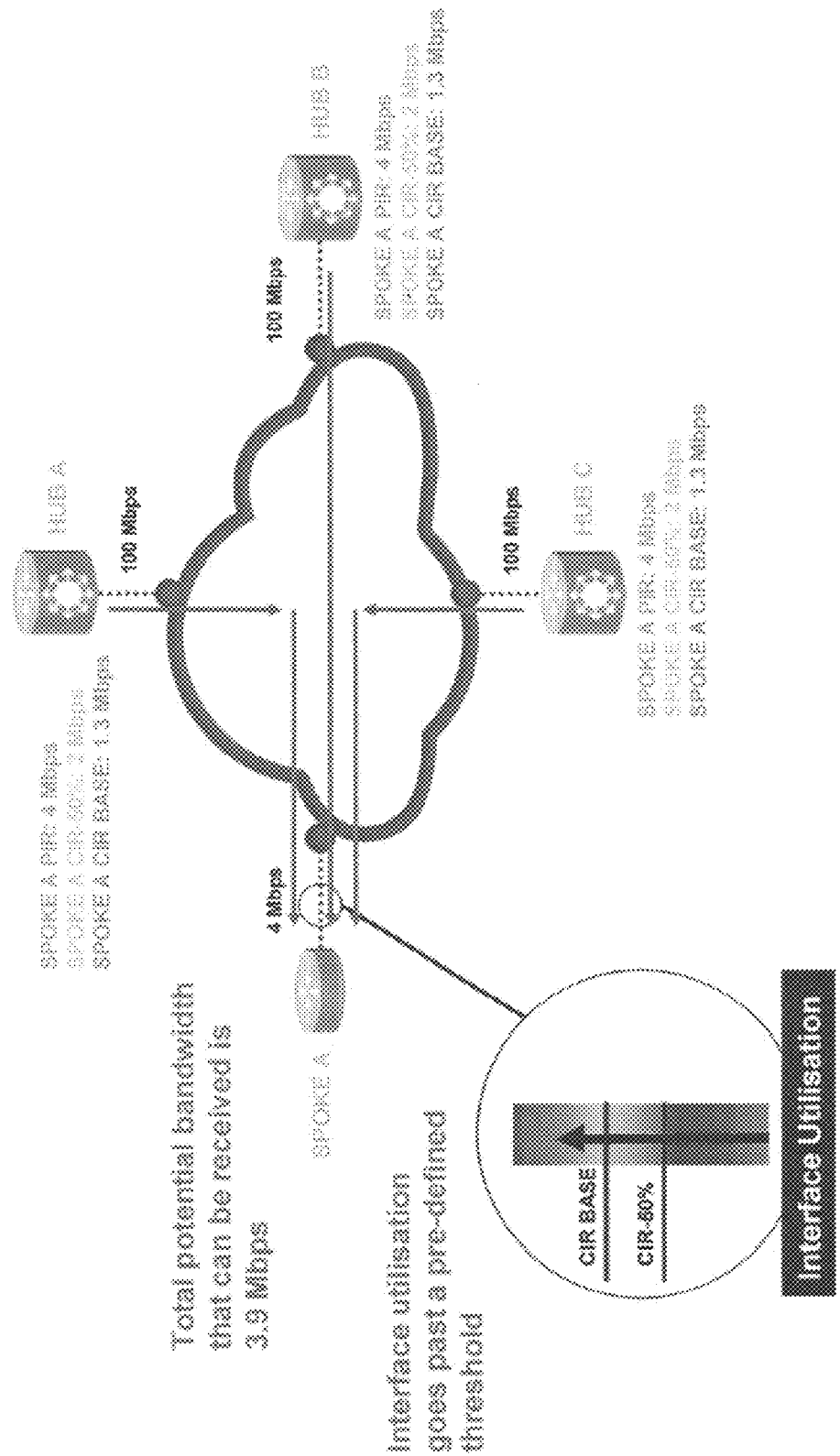

Before discussing illustrative architectures and operational aspects of congestion management according to the present disclosure shown in FIG. 3A(A)-FIG. 3(G), we note that—according to aspects of the present disclosure—a spoke may perform congestion management and is preferably with three hubs that serve as source(s) of packets sent to the spoke. We note that in the context of the present disclosure, a spoke may refer to remote equipment, while a hub may refer to equipment that serves as an aggregating point for that remote equipment. Spokes and hubs may advantageously be computer-networking devices including—but not limited to—gateways, routers, switches, bridges, hubs, repeaters, or computers configured to provide any combination of such functionality.

According to other aspects of the present disclosure, a server computer or another type of data-processing/computations system performs these operations and works in concert with the spoke (e.g., router, etc.) by receiving incoming packets. In some embodiments of the present disclosure, at least some operational steps associated with activating and deactivating traffic shaping may be "built upon" other software systems—as is known in the art and may act as an interpreter—and interfaces via one or more application program interfaces (APIs) with an operating system (OS) which in turn may be associated with a router or other networking device.

Note further at this time that as those skilled in the art will readily appreciate, techniques according to the present disclosure may operate in an environment where a different—or variable—number of hubs provide packets to the spoke. More particularly, one or more spokes may provide a particular hub with packets—rather than the other way around as illustratively described herein. Still further, in such alternative arrangements, techniques disclosed herein may include the one or more spokes providing a hub with packets wherein the spokes have different Peak Information Rates (PIRs) and/or Committed Information Rates (CIRs) from one another.

With initial reference now to FIG. 3(A), there is shown an illustrative example of a hub and spoke arrangement of nodes in communication via an Internet according to aspects of the present disclosure. As depicted therein, the spoke (Spoke A) exhibits a 4 Mbps PIR and the hubs (Hub A, Hub B, Hub C) each exhibit a 100 Mbps PIR.

Operationally, the spoke provides its utilization-related characteristics to each hub, namely its PIR, CIR-50% (i.e., middle tier), and CIR BASE. As we have noted and is shown in the figure, the spoke exhibits a PIR of 4 Mbps which—from the given hub's perspective corresponds to a maximum rate at which a given hub may transmit to the spoke in the absence of any traffic shaping.

Additionally shown in this figure is that the spoke exhibits a CIR-50% of 2 Mbps which—from a given hub perspective—corresponds to the maximum rate at which that hub can transmit to the spoke if the hub received a shaping flag corresponding to a middle tier of congestion management. Finally, as shown in this figure, the spoke exhibits a CIR BASE of 1.3 Mbps which—from a given hub perspective—corresponds to the maximum rate at which that hub can transmit to the spoke if the hub has received a shaping flag corresponding to a high tier of congestion management. As will be readily appreciated by those skilled in the art, values may be applied that are different from those depicted/discussed and different methods may be employed to specify the various levels.

Turning now to FIG. 3(B), there is shown in illustrative schematic form the network architecture of FIG. 3(A) showing the spoke receiving packets from the hubs. In this illustrative example, the spoke (Spoke A) exhibits a PIR of 4 Mbps for each of the hubs (Hub A, Hub B, Hub C). More specifically, each of the Hubs exhibit for Spoke A, a PIR of 4 Mbps, a CIR-50% of 2 Mbps, and a CIR BASE of 1.3 Mbps. As may be observed in the Interface Utilisation call out, the lower threshold is not exceeded with respect to the interface utilization. More specifically, the total bandwidth supported by the spoke is 12 Mbps and that level not being yet reached.

Turning now to FIG. 3(C), there is shown a continuation of the illustrative FIG. 3(B) showing the spoke receiving packets from the hubs. In this continuing illustrative example—and as may be observed in the Interface Utilisation call out, the lower threshold is now exceeded with respect to the interface utilization. That is to say, the CIR-50% level is being exceeded at this point of time. As a result of this excess, a response trigger depicted in FIG. 3(D) is produced.

With reference to that FIG. 3(D), it may be observed that the Interface Utilisation of the spoke (Spoke A) exceeds a pre-defined threshold. As a result, the spoke will transmit message(s) to each of the hubs (Hub A, Hub B, Hub C)

indicating that traffic shaping must occur. More particularly, spoke sends to the hub(s) a message indicating that traffic shaping should occur at the CIR-50% level—in this particular illustrative example. Those skilled in the art will understand and appreciate that the 50% level is merely illustrative and that the actual level required may be set to any level.

Continuing with our illustrative operational scenario, and with reference to FIG. 3(E), it may be observed that as a result of Spoke A transmitting the traffic shaping request of CIR-50% to each of the Hubs (Hub A, Hub B, Hub C), the total potential bandwidth that can be received by Spoke A is now 6 Mbps (50% decrease). As noted previously with respect to FIG. 3(D), the CIR-50% message transmitted from the spoke to the hubs resulted was necessitated by the Interface Utilisation exceeding the CIR-50% level. As shown in the Interface Utilisation inset of this FIG. 3(E), the interface is still exceeding the pre-defined threshold.

FIG. 3(F) shows the continuing illustrative operational scenario in which the Interface Utilisation exceeds another pre-defined threshold namely, the CIR BASE threshold. While the Spoke A total potential bandwidth that can be received is 6 Mbps, the interface is nevertheless being exceed. In response—and as shown illustratively in this figure the spoke (Spoke A) will transmit a CIR BASE traffic shaping message to each of the hubs (Hub A, Hub B, and Hub C). As noted, this message is in response to the CIR BASE Interface Utilisation threshold being exceeded as indicated by the Interface Utilisation callout shown in the figure.

Continuing with our discussion of the operational scenario described in FIGS. 3(A)-3(F), and with reference to FIG. 3(G) it may be observed that in response to the CIR BASE traffic shaping message sent from the Spoke A to the Hubs (Hub A, Hub B, and Hub C), the total potential bandwidth that may be received by the spoke is now 3.9 Mbps. Accordingly, the hubs will each shape their traffic sent to the spoke to the CIR BASE level of 1.3 Mbps thereby limiting the total amount possible at the spoke to be the 3.9 Mbps level.

At this point, those skilled in the art will readily appreciate that with regard to monitoring the interface utilization for the purposes of traffic shaping (at any level), the spoke may monitor the interface periodically (e.g., every 5 seconds, every 10 seconds, etc.) to determine interface utilization and its relation to any set or other pre-determined thresholds. AS may be further appreciated, such monitoring may be performed in any of a variety of ways known in the art such as periodic polling and/or interrupt driven when input buffer(s) or other structures exceed a threshold or exhibit an overrun condition—for example.

Note that with regard to deactivating any shaping activated—in contrast to the activation/initiation of shaping depicted in FIG. 3(A)-FIG. 3(G), consider an illustrative situation wherein activation of shaping occurs at an interface utilization of 60%. In such a situation, the utilization at which deactivation may occur may be set at a level that is lower than that of activation—for example—40%. We note further that these values used in this discussion are purely illustrative and different values—or number of values—may be advantageously employed in specific implementations. In preferred embodiments, the activation and deactivation thresholds are set at different levels, i.e., 60% activation and 40% deactivation.

Note further that even with this type of delay between interface utilization at the activation level (i.e., 60%) and falling to the deactivation level (40%), the utilization may rise suddenly back to the activation level of 60%. This may result—for example—by different network protocols being employed by various network equipment along network transmission path(s). This is especially true as different network protocols exhibit different efficiencies. As a result, it may be advantageous for interface utilization sampling intervals to be longer for deactivation of shaping (i.e., 30 seconds, 1 minute, 3 minutes, etc.) than activation (e.g., 5 seconds, 10 seconds, etc.). Such a longer deactivation sampling period may provide sufficient time for protocol changes made/experienced by a spoke and/or hub(s) to propagate through the network and any particular protocol stacks employed.

Those skilled in the art will appreciate that—according to additional aspects of the present disclosure—the ratio(s) of sampling intervals of activation monitoring as compared with sampling intervals of deactivation monitoring is a predetermined value (e.g., 2, a value greater than 2, 5, a value greater than 5, 10, a value greater than 10, etc.).

Furthermore, any counter(s) employed for sampling interval determination(s) may be reset if after utilization level(s) fall below a deactivation level it rises above that level again, even if the utilization remains below the activation level. As will be understood by those skilled in the art, such reset(s) may prevent a sudden rise to a much higher level (e.g. above the activation level).

As another illustrative example, consider the scenario in which there are two shaping levels: one at 60% utilization (i.e., the middle tier) and another at 80% utilization (i.e., the upper tier). Consider further for this scenario that a shaping deactivation level is set at 40% utilization.

If the utilization is above 80%, and maximum shaping is accordingly in effect, and the utilization drops below 80%, one may expect that the maximum shaping could be deactivated. However, it is noted that the utilization may quickly rise above 80% in certain conditions. Therefore—and according to aspects of the present disclosure as discussed above—the maximum shaping may continue even if utilization drops below, say 60% (mid-tier). Accordingly, aspects of the present disclosure will maintain the 80% traffic shaping in such a scenario unless and until the utilization level drops to below 40% (the deactivation level). If, on the other hand, the utilization drops below 80% for a certain period of time—then the 60% (mid-tier) shaping may be invoked.

Advantageously, activation utilization and deactivation utilization level(s) may be determined in any of a number of ways including mathematically, empirically, and so on. For example—and in no way limiting—testing the interface (last mile) ahead of live operation and fitting PIR to versus % of access to which the system should shape may result in a deterministic relation between the PIR or speed of a given spoke and the upper tier threshold for shaping. Additionally, a relationship between when shaping activates and the number of hubs that send packets to the particular spoke. For example, if shaping is required at 80 Mbps incoming to a spoke, and there are four hubs, then each hub may send 20 Mbps to that spoke. Note that such proportions may advantageously be interchanged among hubs, such that certain hubs are permitted to send more packets per unit time, while some hubs are only permitted to send fewer.

Figure 4:
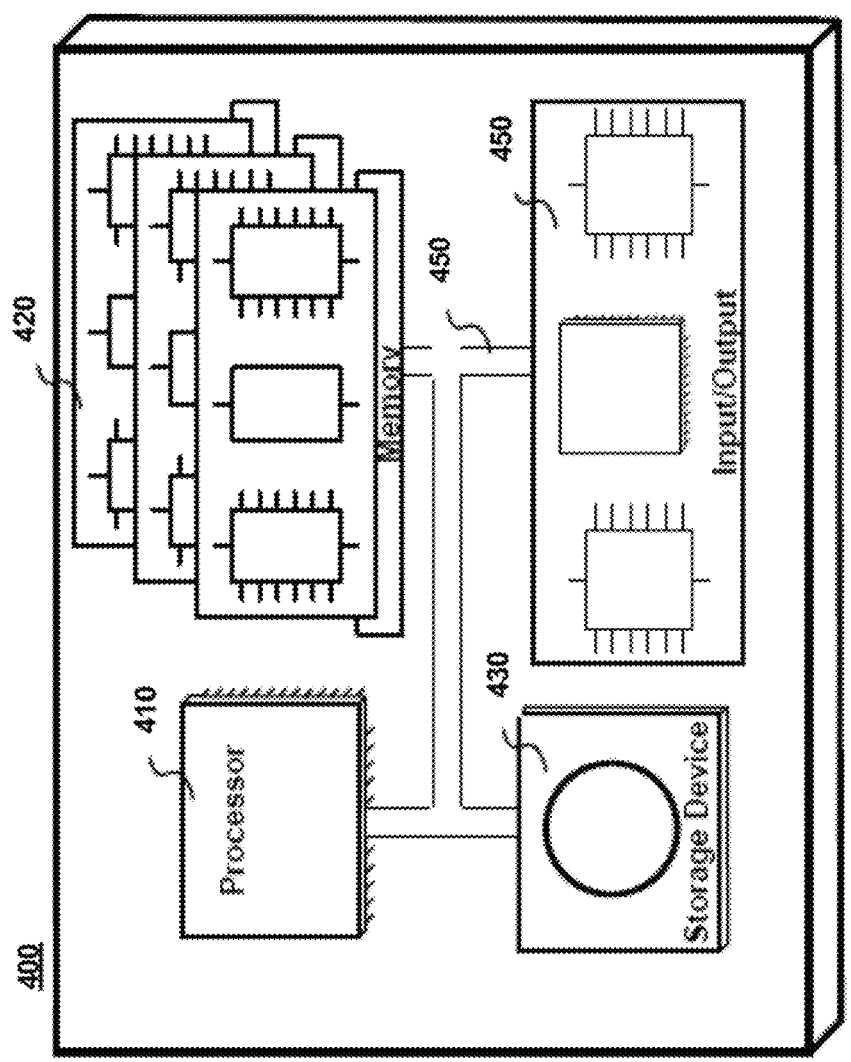
FIG. 4 shows an illustrative computer system that may be incorporated into systems according to the present disclosure and operate to execute methods according to the present disclosure.

Finally, FIG. 4 shows an illustrative computer system 400 suitable for implementing methods and incorporation into systems according to an aspect of the present disclosure. As may be immediately appreciated, such a computer system may be integrated into another system may be implemented via discrete elements or one or more integrated components. The computer system may comprise, for example a computer running any of a number of operating systems. The above-described methods of the present disclosure may be implemented on the computer system 400 as stored program control instructions.

Computer system 400 includes processor 410, memory 420, storage device 430, and input/output structure 440. One or more busses 450 typically interconnect the components, 410, 420, 430, and 440. Processor 410 may be a single or multi core.

Processor 410 executes instructions in which embodiments of the present disclosure may comprise steps described previously and/or outlined in one or more of the Drawing figures. Such instructions may be stored in memory 420 or storage device 430. Data and/or information may be received and output using one or more input/output devices.

Memory 420 may store data and may be a computer-readable medium, such as volatile or non-volatile memory. Storage device 430 may provide storage for system 400 including for example, the previously described methods. In various aspects, storage device 430 may be a flash memory device, a disk drive, an optical disk device, or a tape device employing magnetic, optical, or other recording technologies.

At this point, those skilled in the art will readily appreciate that while the methods, techniques and structures according to the present disclosure have been described with respect to particular implementations and/or embodiments, those skilled in the art will recognize that the disclosure is not so limited. In particular, our illustrative examples have depicted a single intermediate level of utilization/traffic/congestion. Those skilled in the art will of course recognize that there may be multiple intermediate utilization/traffic/congestion levels as dictated by deployment requirements. Accordingly, the scope of the disclosure should only be limited by the claims appended hereto.

The invention claimed is:

1. A method for congestion management in a network, said network having a hub and spoke configuration wherein an individual spoke data processing system is interconnected via the network to a plurality of hub data processing systems, said method comprising:
    provisioning, by the spoke data-processing system a deactivation level and a first activation level, wherein the deactivation level is less than the first activation level;
    monitoring, by the spoke data-processing system, an ingress interface for utilization by incoming packets;
    only if the utilization rises above the first activation level, transmitting a first message by the spoke data processing system to the plurality of hub data-processing systems, wherein the plurality of hub data-processing systems are a source of at least some of the incoming packets, and wherein the first message indicates that traffic shaping is to occur in accordance with the first activation level; and
    only if the utilization falls below the deactivation level, transmitting a second message by the spoke data processing system to the plurality of hub data-processing systems, wherein the second message indicates that traffic shaping is to cease.

2. The method of claim 1 further comprising:
    provisioning a second activation level wherein the second activation level is greater than the first activation level; and
    only if the utilization rises above the second activation level, transmitting a third message by the spoke data processing system to the plurality of hub data-processing systems, wherein the third message indicates that traffic shaping is to occur in accordance with the second activation level.

3. The method of claim 2 wherein at least one of the first activation level, and the second activation level is based on the speed (e.g., Peak Information Rate) of the ingress interface.

4. The method of claim 3 wherein the monitoring of the ingress interface occurs at a first sampling rate for the purpose of determining whether to signal to the plurality of data-processing systems to activate traffic shaping, and at a second sampling rate for the purpose of determining whether to signal to the plurality of data-processing systems to deactivate traffic shaping.

5. The method of claim 4 wherein the second sampling rate is less frequent than the first sampling rate.

6. The method of claim 5 wherein if the utilization falls below the second activation level, the spoke data-processing system transmits the second message only if the utilization has also fallen below the deactivation level.

7. The method of claim 6 further comprising resetting a counter for monitoring for deactivation of traffic shaping if utilization rises above the deactivation level after the counter for monitoring for deactivation of traffic shaping has been started by the utilization falling below a predetermined level.

8. The method of claim 7 wherein the predetermined level is the deactivation level.

9. The method of claim 7 wherein the predetermined level is one of the first activation level and the second activation level.

10. An apparatus for congestion management in a network having a hub and spoke configuration, the apparatus comprising:
    a spoke data-processing system for interconnecting via the network to a plurality of hub data processing systems, the spoke data-processing system including a processor and a transmitter
    the processor configured to:
        provision a deactivation level and a first activation level, wherein the deactivation level is less than the first activation level, and
        monitor an ingress interface for utilization by incoming packets;
    the transmitter configured to:
        only if utilization rises above the first activation level, transmit a first message to a plurality of hub data-processing systems, wherein the plurality of hub data-processing systems are a source of at least some of the incoming packets, and wherein the first message indicates that traffic shaping is to occur in accordance with the first activation level, and
        only if the utilization falls below the deactivation level, transmit a second message to the plurality of hub data-processing systems, wherein the second message indicates that traffic shaping is to cease.

11. The apparatus of claim 10 further comprising:
    wherein the processor is further configured to provision a second activation level wherein the second activation level is greater than the first activation level; and
    wherein the transmitter is further configured to only if the utilization rises above the second activation level, transmit a third message to the plurality of hub data-processing systems, wherein the third message indicates that traffic shaping is to occur in accordance with the second activation level.

12. The apparatus of claim 11 wherein at least one of the first activation level, and the second activation level is based on the speed (e.g., Peak Information Rate) of the ingress interface.

13. The apparatus of claim 12 wherein the monitoring of the ingress interface occurs at a first sampling rate for the purpose of determining whether to signal to the plurality of hub data-processing systems to activate traffic shaping, and at a second sampling rate for the purpose of determining whether to signal to the plurality of hub data-processing systems to deactivate traffic shaping.

14. The apparatus of claim 13 wherein the second sampling rate is less frequent than the first sampling rate.

15. The apparatus of claim 14 wherein if the utilization falls below the second activation level, the spoke data-processing system transmits the second message only if the utilization has also fallen below the deactivation level.

16. The apparatus of claim 15 wherein the processor is further configured to reset a counter for monitoring for deactivation of traffic shaping if utilization rises above the deactivation level after the counter for monitoring for deactivation of traffic shaping has been started by the utilization falling below a predetermined level.

17. The apparatus of claim 16 wherein the predetermined level is the deactivation level.

18. The apparatus of claim 16 wherein the predetermined level is one of the first activation level and the second activation level.

* * * * *